May 18, 1926.
H. SOULE
TRAP
Filed Dec. 30, 1924
1,585,568
2 Sheets-Sheet 1
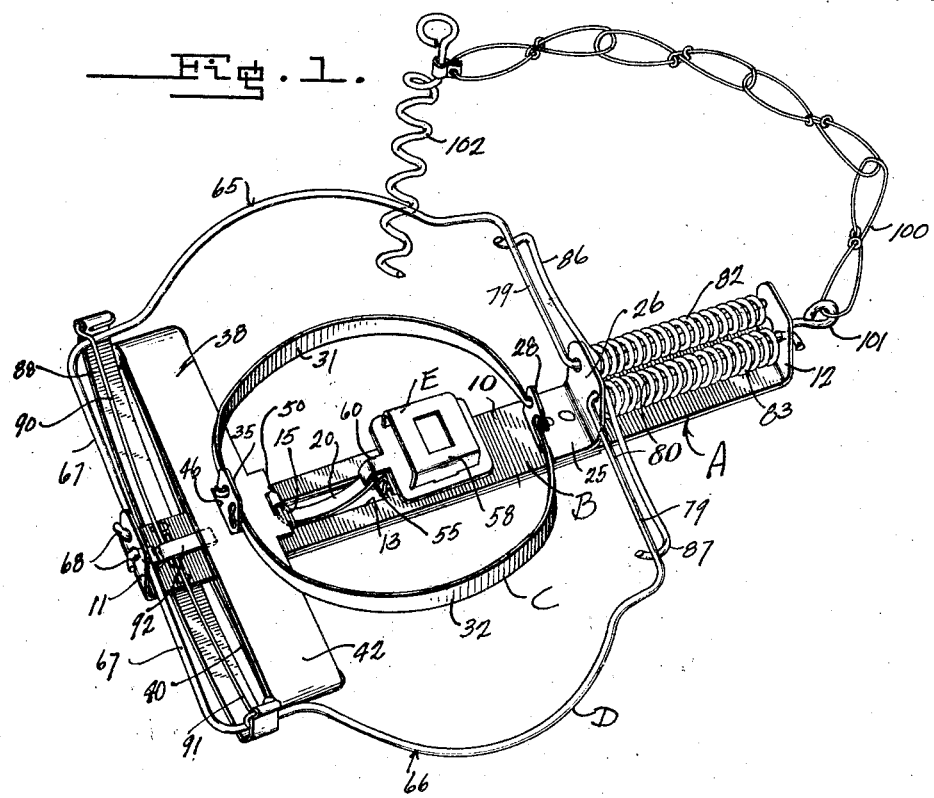
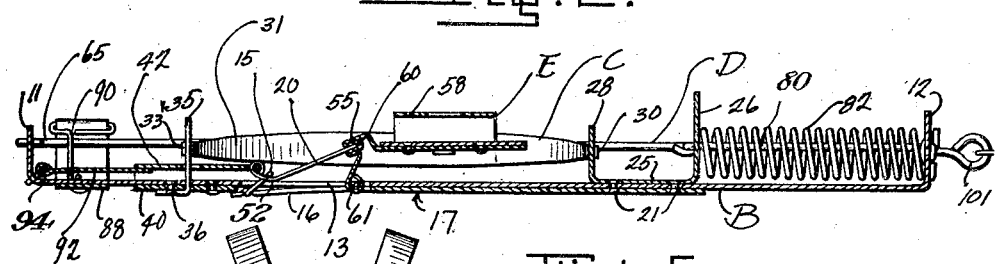
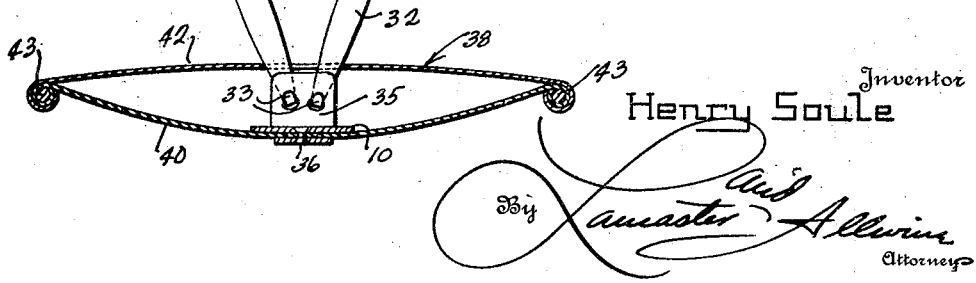
Inventor
Henry Soule

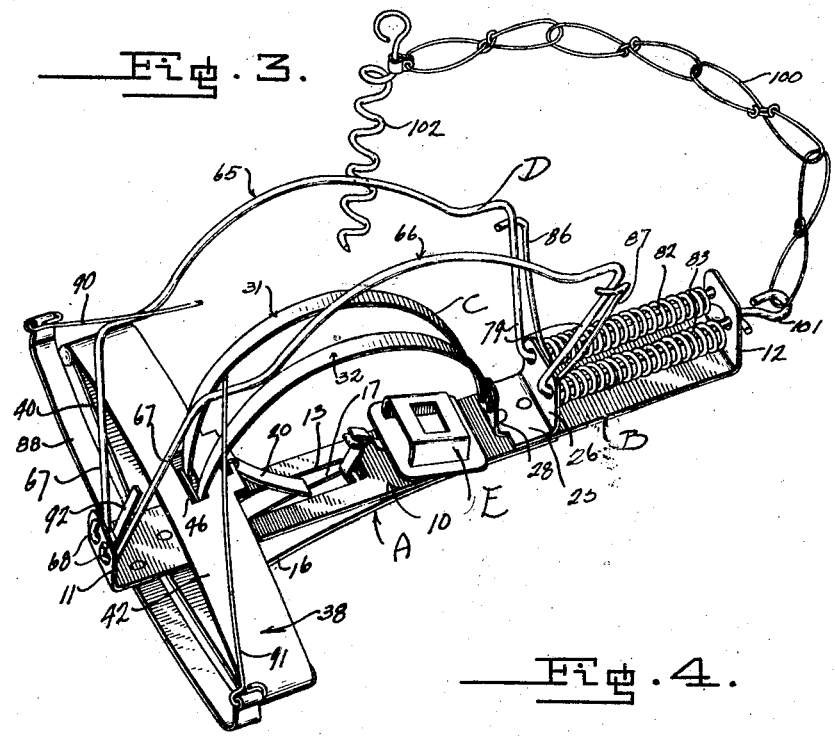
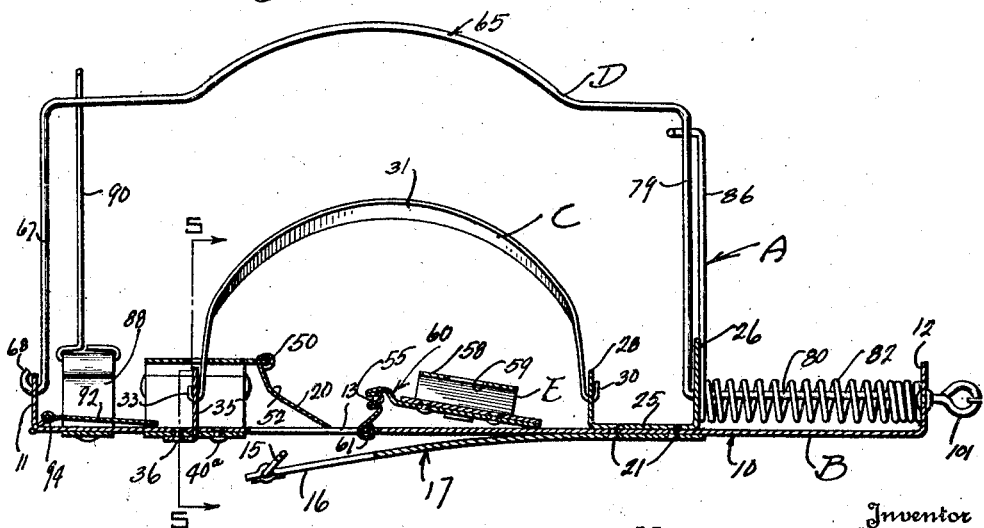

Patented May 18, 1926.

1,585,568

UNITED STATES PATENT OFFICE.

HENRY SOULE, OF DWIGHT, NORTH DAKOTA.

TRAP.

Application filed December 30, 1924. Serial No. 758,883.

This invention relates to improvements in animal traps.

The primary object of this invention is the provision of a spring operated animal trap embodying novel operating means for main gripping and body holding sets of jaws.

A further and important object of this invention is the provision of improved means adapted to cooperate with the tripping of the jaws of the trap in order to cause the trap to "jump" and insure the capture of an animal.

Other objects and advantages of this invention will be apparent during the course of the following detailed description.

In the accompanying drawings, forming a part of this specification, and wherein similar reference characters designate corresponding parts throughout the several views, Figure 1 is a perspective view of the improved trap, showing it set.

Figure 2 is a cross sectional view taken substantially longitudinally of the improved trap, showing the same set.

Figure 3 is a perspective view of the improved trap substantially in a position which the same will assume when holding an animal.

Figure 4 is a cross sectional view taken longitudinally of the trap in its released position.

Figure 5 is a cross sectional view taken substantially on the line 5—5 of Figure 4.

In the drawings, wherein for the purpose of illustration is shown only a preferred embodiment of the trap, the letter A may generally designate the same, which may include a frame B; main gripping jaws and operating means C; auxiliary or body gripping jaws and operating means D; and movable bait receiving means E.

The frame B is preferably formed of any approved grade of material, preferably metal, and comprises the elongated frame body 10, formed of one or more pieces, and which at one end thereof is flanged, as at 11, at right angles to the body, and at the opposite end is upwardly flanged at right angles, at 12. An elongated slot 13 is provided in the body 10 to permit a substantially U-shaped crank portion 15, which is movably carried at the free bifurcated end 16 of the trap "jumping" spring 17 to extend upwardly thru said slot 13, for the purpose of receiving the pivoted catch 20, as will be subsequently described.

The spring 17 is connected as by rivets 21 to the bottom surface of the frame body 10, and at its free end normally extends in downwardly diverging relation from the plane of the body 10, and the same is of sufficient resiliency to cause the entire trap to be thrown upwardly when the spring 17 is suddenly released from its collapsed position along the frame, as is illustrated in Figure 2, to the extended position of said spring as illustrated in Figure 4.

Referring to the main jaw structure C, a substantially U-shaped bracket 25 is riveted, as by the rivets 21, upon the top surface of the frame body 10, and this bracket 25 provides an upstanding flange 26 in spaced parallel relation with the end flange 12, and also provides an upstanding right angled flange 28 parallel with the flange 26, between the flange 26 and the slot 13. This flange 28 is provided with suitable transverse openings to pivotally receive ends 30 of the main jaws 31 and 32, at an end of each of said main jaws. At the opposite ends 33 the main jaws 31 and 32 are pivoted to an upstanding bracket 35, secured as by rivet 36 to the body 10; said bracket 35 extending at right angles to the body 10, at the opposite side of the slot 13 with respect to the flange 28. The jaws 31 and 32 are preferably U-shaped, and are pivotally connected at their ends 30 and 33 to the brackets 28 and 35. These jaws may be of any approved construction, and materials, and as illustrated in the drawings they provide smooth jaw edges, but they may be toothed, if desired.

A main operating spring structure 38 may be provided for moving the jaws 31 and 32 to clamping position, and this main spring 38 is very strong, and includes a bottom leaf 40, secured intermediate its ends as by the rivet 36 and other rivets 40ª, at the lower surface of the body 10; at right angles to the body 10, and at each end thereof projecting beyond the side edges of said body 10. The laterally projecting portions of this bottom leaf 40 bow upwardly, as is illustrated in Figure 5 of the drawings, and at the outer edges of said transverse spring leaf 40, the same is rolled for connection to the rolled ends of the top spring leaf 42; connecting pins 43 preferably also securing the leaves 40 and 42 at their free ends. The top spring leaf 42 extends in spaced relation above the frame 10, and is not directly connected to said body 10. Between its ends said top leaf 42 is provided with an elongated slot 46 therein, and it is to be noted that the top leaf 42 is disposed above the bracket 35, so that when the top leaf 42 is depressed, as by downwardly flexing the projecting ends of the bottom leaf 40, said bracket 35 may extend upwardly through the slot 46. It is to be noted that the ends of the clamping jaws 31 and 32 extend through the slot 46 for connection to the bracket 35.

The resiliency of the spring structure 38 is sufficient to force the top leaf 42 upwardly so that the bracket 35 does not extend through said slot, and to bring the jaws 31 and 32 into engagement with the end edges of the slot 46, for forcing said jaws 31 and 32 into substantially vertical clamping relation. When the spring leaves 40 and 42 are collapsed, the bracket 35 lies within the slot 46, and the main jaws 31 and 32 may then be collapsed into horizontal position, substantially as is illustrated in Figure 1 of the drawings.

In order to hold the leaves 40 and 42 of the main spring structure 38 in a set position, the catch member 20 is provided, which may be of a good grade of material, pivoted as at 50 to the side portion of the topmost leaf 42 which faces the slot 13. This member 20 is narrow enough to extend downwardly through the slot 13, and into the space between the bifurcated end 16 of the "jump" spring 17, and is provided with a bight 52 so that the said member 20 may be slipped through the pivoted crank 15 of the spring 17, and at its free end be brought upwardly above the body 10, to collapse the spring 17 along the body 10; and at its free end said catch 20 being received within a socket 55 provided by the bait receiving device E, in order that said bait receiving device E will act somewhat as a trigger.

The bait receiving device E includes the box portion 58, which may provide a suitable open compartment 59 to receive bait. It furthemore includes a supporting arm 60, which may be of suitable spring material, secured to the box 58, and providing the socket 55 above mentioned, in facing relation toward the slot 13. At its end the arm 60 is downturned substantially at right angles to the box 58, and is pivoted at its free end 61 to the body 10 of the frame B, at an end of the slot 13. When the spring leaves 40 and 42 are collapsed to permit the main jaws 31 and 32 to open, the action of the springs 38 and 17 will exert a downward pressure at the free end of the member 20, causing the bait box 58 to elevate above the body 10, substantially in a horizontal position as is illustrated in Figure 2 of the drawings, and so that by very slight touch upon the box 58, the same will cause the arm 20 to be released, and permit the springs 17 and 38 to release.

Referring to the auxiliary jaw structure D, the same preferably includes a pair of wire body gripping jaws 65 and 66, which are substantially U-shaped, and considerably larger than the main jaws 31 and 32. At their front ends these jaws 65 and 66 provide the end portions 67 which are pivoted as at 68 to the end flange 11 of the body 10, and in spaced forward relation with respect to the front pivoted ends of the main jaws 31 and 32. The jaws 65 and 66 at the opposite ends provide the portions 79 which pivotally extend through suitable openings provided in the bracket flange 26, and provide the straight shaft portions 80 in spaced parallel relation above the body 10, which at their free ends bear in the upstanding flange 12. These shaft portions 80 receive spiral expansion springs 82 and 83 thereabout, respectively, for the jaws 65 and 66. The adjacent ends of each of said springs 82 and 83 are connected to the flange 12 in any approved manner, or to the body 10, and at their opposite ends said springs 82 and 83 provide the outwardly extending portions 86 and 87, slidably connected to the ends 79 of the jaws 65 and 66 respectively, so that upon the opening of the jaws 65 and 66 said springs will be compressed and normally urge the auxiliary body gripping jaws 65 and 66 to upwardly extending body clamping relation, substantially as is illustrated in Figures 3 and 4 of the drawings.

Means is provided to hold the jaws 65 and 66 in open position, and this means comprises a transverse member 88, which may be resilient in nature, connected intermedate its ends to the body 10, at the extreme front of the body 10, preferably forwardly of the spring 38. The said member 88 is about as long as the bottom leaf 40 of the spring structure 38, preferably even slightly longer, and at the outer ends of the same it pivotally supports the jaw cooperating catch arms 90 and 91. A pivoted arm or member 92 is carried by the body 10 at the front end thereof, as at 94, so that the free end thereof may be moved to extend just slightly in overlapped relation by the top leaf 42 of the main spring 38.

Referring to the action of the auxiliary jaws 65 and 66 in set position, and to the operation thereof, said jaws 65 and 66 when open, as above mentioned will tension the springs 82 and 83. The arms 90 and 91 are respectively extended over said open jaws 65 and 66, and at their free ends are then placed beneath the member 92, so that when said member 92 is held collapsed on the body 10, as is illustrated in Figures 1 and 2 of the drawings, the arms 90 and 91 will be maintained in a fixed relation with the body 10, at their free ends, to prevent opening of the jaws 65 and 66. The member 92 is held in this position to prevent its release movement by means of the compressed position of the main spring structure 38, in the relation above mentioned.

A chain or cable 100 may be connected, as by a staple 101, to the rear end flange 12 of the frame B, and at its free end said cable 100 may be secured to a ground inserting spiral shaped wire screw 102 or analogous ground or article inserting member.

From the foregoing description of this invention it will be apparent just how the improved trap A operates. As the animal approaches the trap to snatch the bait held by the receiver E, unintentionally the animal will of course move the box 53 slightly downward, releasing the free end of the catch 20 from its socket 55. Immediately the main spring 38 springs upwardly, and the top leaf 42 thereof engages the main jaws 31 and 32 snapping them upwardly into collapsed catching position. Simultaneous with this action the bottom spring 17 is released by release of the member 20, and this bottom spring 17 is sharply forced downward, incident to its inherent spring, and the entire trap is thrown bodily upwardly to further insure that the animal is clamped by the upper springing of the main jaws 31 and 32. Also, simultaneous with this action the upward springing of the top leaf 42 of the main spring 38 will release the catch member 92 at its free end, and incident to the action of the springs 82 and 83 the auxiliary or body gripping jaws 65 and 66 will be swung upwardly, since the arms 90 and 91 will be released upon release of the catch member 92, and may swing upwardly to permit the swinging of the auxiliary jaws 65 and 66 into body clamping position.

The improved trap A presents a very compact assemblage of parts. It is to be noted that the spring operation is particularly valuable, and the jaw operation while sufficient to catch the animal and prevent the animal freeing itself from the inner or main clamping jaws, said jaw system and spring operating means is yet of such a nature that the same will not mutilate the animal or permit the animal to mutilate itself. The trap is one which can lie comparatively flat upon a ground surface, so as not to arouse the suspicion of the animal approaching the same.

Various changes in the shape, size, and arrangement of parts may be made to the form of invention without departing from the spirit of the same or the scope of the claims.

I claim:

1. An animal trap comprising an elongated narrow frame, a plurality of jaws pivotally carried by said frame, a transverse main spring structure having an opening therethrough through which the said jaws extend so that said jaws will be supported in proximate clamping relation when the spring is extended, a movable bait receiving member carried by the frame, and a catch member movably carried by said spring for connection with said bait receiving member to hold the spring compressed and permit the opening of said jaws.

2. A trap comprising a frame, a pair of clamping jaws pivotally carried by said frame, a transverse leaf spring connected with said frame and intermediate its ends providing a slot adapted to receive the ends of said jaws therethrough, and releasable catch means adapted for connection with the frame to hold said leaf spring compressed and permit opening of the jaws, said spring when moving to extended position being adapted to engage said jaws to sharply close the same for clamping an animal therebetween.

3. A trap comprising a frame, clamping jaws movably carried by the frame a transverse main spring structure including a bottom leaf secured intermediate its ends to said frame and a top leaf secured at its ends to said bottom leaf and otherwise being free of said frame, said top leaf having an opening therein through which the ends of said jaws extend to hold the jaws in clamped position when the top leaf is extended, and releasable catch means to hold said leaf of the spring compressed to permit opening of said jaws.

4. A trap comprising a frame, clamping jaws movably carried by the frame, a transverse main spring structure including a bottom leaf secured intermediate its ends to said frame and a top leaf secured at its ends to the ends of said bottom leaf and otherwise being free of said frame, said top leaf having an opening therein through which the ends of said jaws extend to hold the jaws in clamped position when the top leaf is extended, releasable catch means to hold said leaves of the spring compressed to permit opening of said jaws, and a spring carried below said frame adapted to be held collapsed by said releasable catch means and upon release of said catch means to force the trap bodily upwardly.

5. A trap comprising a frame having an opening therein, a pair of substantially U-shaped clamping jaws pivotally carried upwardly of said frame, a main spring structure including a transversely extending upper spring leaf providing an opening therein through which the ends of said jaws extend whereby when the leaf is extended said jaws will be held thereby in a clamping relation, a catch member pivotally connected with said leaf adapted to movably extend toward said opening in the frame, a spring member carried below the frame including an end inherently resiliently spaced from said frame, said catch member being adapted to connect with said last mentioned spring to hold the same collapsed with the free end of said catch member extending above said frame, and movable bait supporting means carried by said frame including a socket adapted to receive the free moving end of said catch member whereby to hold the same in position to collapse said jaw operating spring and the spring below said frame 6. In a trap the combination of a frame providing an opening therein, substantially U-shaped clamping jaws pivotally connected at their ends to said frame, a main spring including a transversely extending resilient top leaf providing an opening through which the adjacent ends of said jaws extend when the main spring is extended whereby to hold said jaws in a clamping relation, a catch member pivotally carried by said leaf of the main spring, a jump spring resiliently supported below the frame, a member movably projecting from the jump spring adapted to be engaged by the catch member intermediate the ends of the latter when the main spring is collapsed, and a bait receiving member including a socket adapted to receive the end of the catch member whereby to hold the same in position with said springs collapsed and the jaws open.

7. In a trap the combination of a supporting frame, a pair of main gripping jaws pivotally connected with the frame, main spring means normally operating to hold the main jaws in clamping position, catch means for said main spring means, body gripping jaws pivotally carried by said frame, spring means normally forcing the same closed, arms pivotally associated with the frame adapted to be folded in position to hold the body gripping jaws open against tension of their springs, and a movable catch member for holding said arms in position to hold the said body gripping jaws open, said last mentioned catch member being adapted to be held in such position by said main spring only when the main spring is collapsed.

8. In a trap the combination of a relatively narrow elongated frame providing a slot longitudinally therein, a jump spring carried by the frame therebelow adapted when released to force the frame upwardly, projecting means movably carried by said jump spring adapted to extend upwardly through the slot of said frame, main jaws pivotally connected upwardly of the frame, a transverse main leaf spring carried by the frame having an opening therein through which ends of said main jaws extend whereby the main leaf will collapse said jaws in clamping position when the main spring is extended, a pivoted catch member carried by said main spring adapted to be inserted through the projection of the jump spring when it is extended upwardly through the slot of said frame, and movable bait receiving means carried by the frame including a socket adapted to receive the free end of said catch member whereby to hold the jump spring and main spring collapsed.

9. An animal trap comprising a narrow elongated frame, a pair of substantially U-shaped main jaws pivoted at their ends upon said frame for swinging transversely of the longitudinal axis of the frame, spring means normally urging said jaws into clamping closed relation, trip means to hold said spring means inoperative when the jaws are open, body gripping jaws pivoted on the frame, spring means acting to force the body gripping jaws closed, a transverse member connected between its ends on the frame and extending laterally from said frame to each side thereof, arms pivoted at the ends of said member swingable towards each other and towards the frame to embrace said body gripping jaws to hold them open, said arms when so engaging the body gripping jaws to hold them open having the free ends thereof disposed in adjacent relation to said frame, and releasable catch means to hold the free ends of said arms in such relation, said releasable catch means being releasably held by the spring means of the main jaws when the latter are opened.

HENRY SOULE.